United States Patent [19]

Beck

[11] Patent Number: 4,593,424

[45] Date of Patent: Jun. 10, 1986

[54] HYDRAULIC RAMP/DOCK/LOADER APPARATUS

[76] Inventor: Earl A. Beck, P.O. Box 308, Springdale, Ark. 72765-0308

[21] Appl. No.: 567,425

[22] Filed: Dec. 30, 1983

[51] Int. Cl.[4] .............................................. E01D 1/00
[52] U.S. Cl. ..................................... 14/71.7; 14/71.5
[58] Field of Search ................... 14/69.5, 71.3, 71.5, 14/71.7

[56] References Cited

U.S. PATENT DOCUMENTS

| | | | |
|---|---|---|---|
| 3,388,413 | 6/1968 | Clarke | 14/71.7 |
| 3,409,923 | 11/1968 | Walker | 14/71.7 |
| 3,685,076 | 8/1972 | Loblick | 14/71.7 |
| 3,921,241 | 11/1975 | Smith | 14/71.7 |
| 4,110,860 | 9/1978 | Neff et al. | 14/71.7 |
| 4,365,374 | 12/1982 | Bennett | 14/71.7 |

Primary Examiner—Stephen J. Novosad
Assistant Examiner—William P. Neuder
Attorney, Agent, or Firm—Head, Johnson & Stevenson

[57] ABSTRACT

A ramp/dock/loader apparatus comprising a ramp section pivotally secured in the proximity of a materials storage area and movable between a lowermost substantially horizontally disposed position to an uppermost substantially vertical position, a dock or platform section pivotally secured to the outer edge of the ramp section and pivotal simultaneously therewith but in an opposite direction whereby the platform section remains in a substantially horizontal orientation during angular movement of the ramp section, and fluid cylinder apparatus operably connected with the ramp section for effecting the pivotal movement thereof.

3 Claims, 5 Drawing Figures

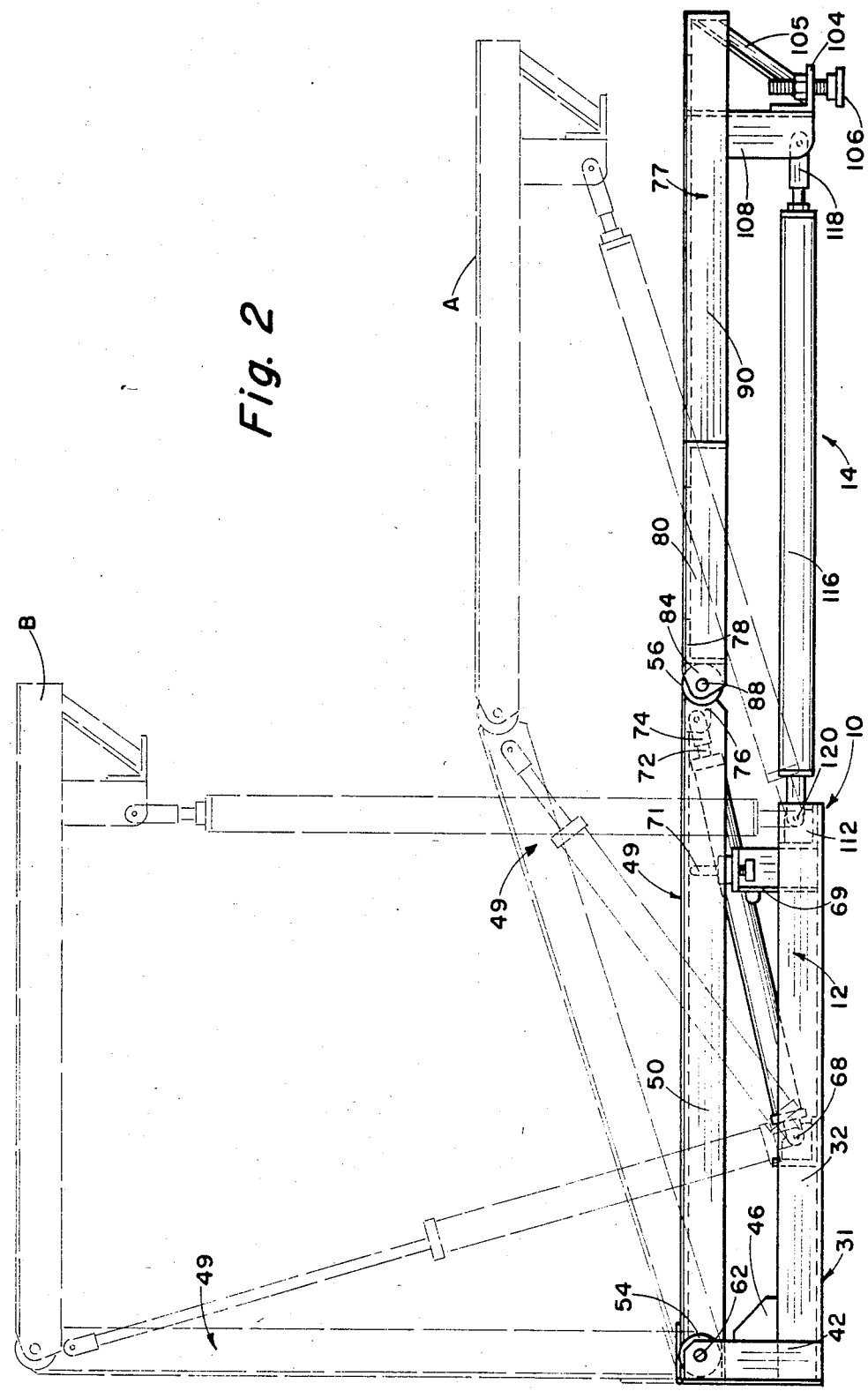

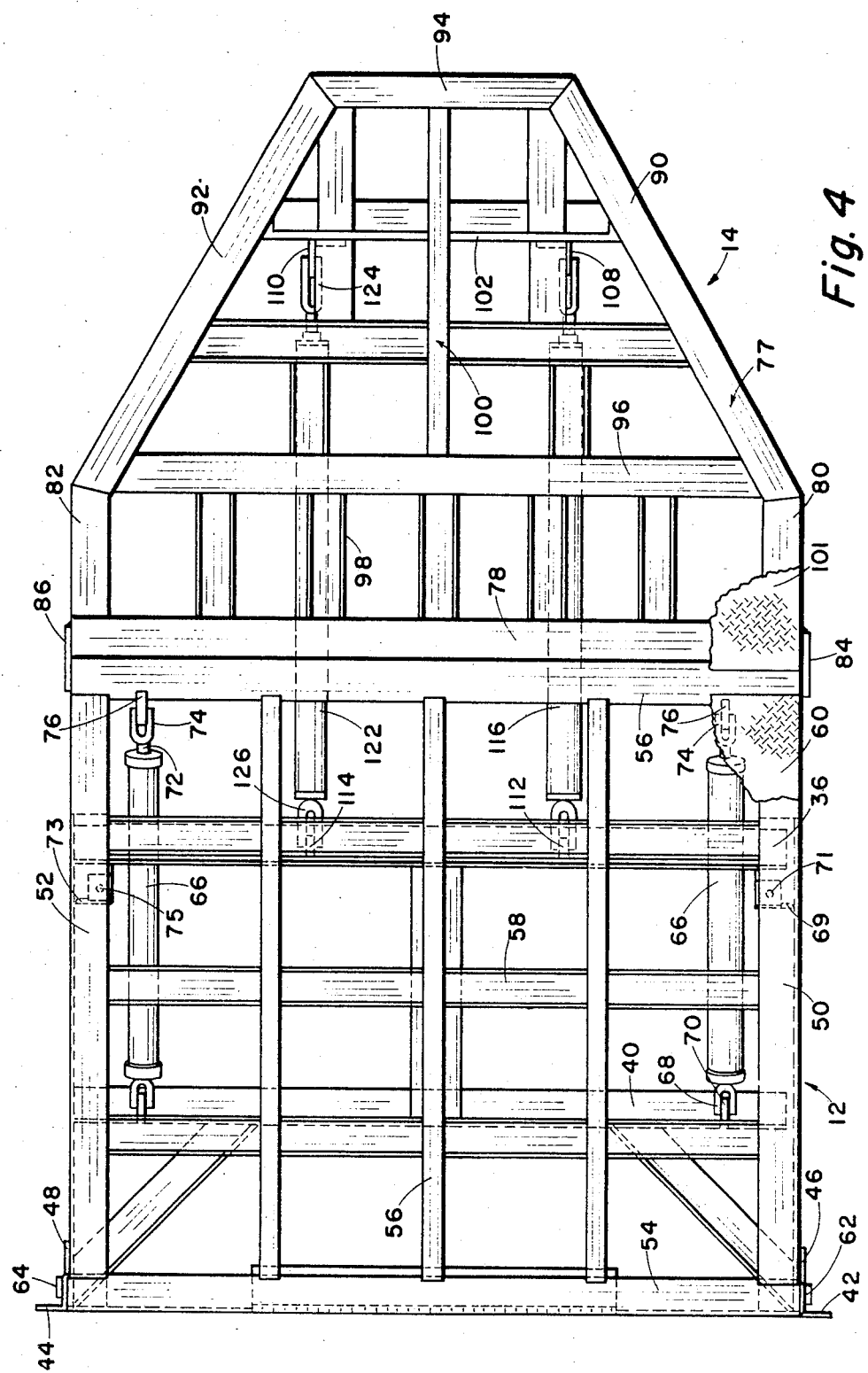

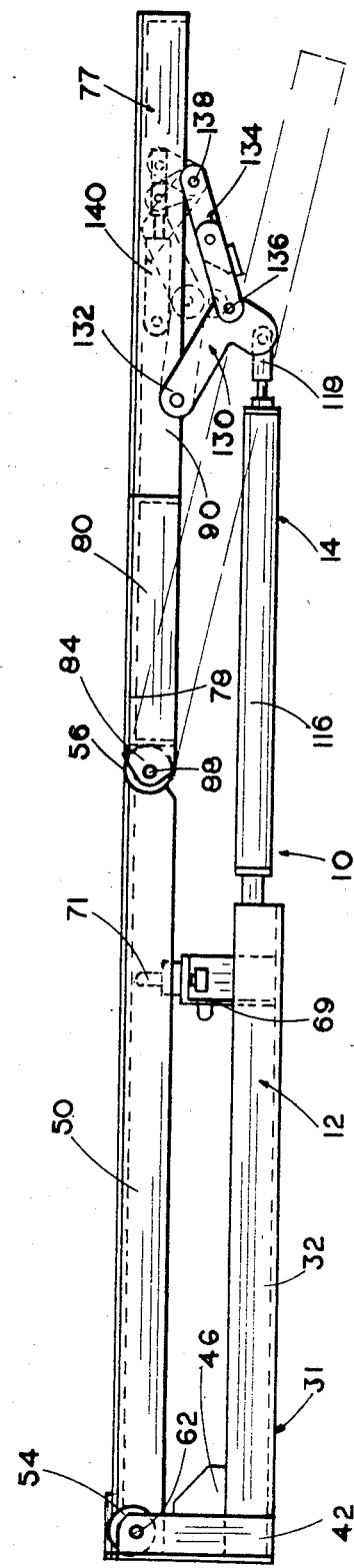

HYDRAULIC RAMP/DOCK/LOADER APPARATUS

BACKGROUND OF THE INVENTION

1. Field of the Invention

This invention relates to improvements in adjustable ramp apparatus and more particularly, but not by way of limitation, to a hydraulically actuated combination ramp, dock and loader apparatus.

2. Description of the Prior Art

In the loading of vehicles at a warehouse dock, or the like, it is common practice to position the vehicle in the proximity of the dock or ramp area for facilitating the loading of materials onto the vehicle from the storehouse, or conversely for facilitating the unloading of materials from the vehicle for transport to a storage area within the warehouse, or the like. The elevation or height of the bed of the transporting vehicle is frequently at a different elevation than that of the dock, and this may cause a problem in the loading or unloading of the vehicle. In addition, many storehouses, or the like, are multiple storied structures, and it is frequently desirable to transfer the materials from the vehicle to the upper story or second floor of the warehouse, or conversely, it may be necessary to transfer materials from the second floor of the vehicle. In addition, it is frequently desirable or necessary to position the vehicle at an angular orientation with respect to the dock, which increases the difficulty of loading or unloading materials therefrom. The disadvantages of these problems will be readily apparent.

There have been some attempts to solve these problems, such as those shown in the Black U.S. Pat. No. 3,578,185, issued May 11, 1971, and entitled "Mechanized Vehicle System;" and the Royce U.S. Pat. No. 4,155,468, issued May 22, 1979, and entitled "Vehicle Mounted Access Ramp Assembly for Wheel Chair Users." The Black patent relates to a vehicle having a cab section movable ninety degrees to the left of the longitudinal center of the vehicle, and a longitudinally movable bed for the vehicle whereby the cab may be swung aside and the vehicle bed may be moved onto the loading dock. The Royce patent is directed toward a ramp structure for vehicles, the ramp being pivotally mounted for movement between a raised position whereby the ramp becomes a sidewall of the vehicle, and a lowered position whereby the ramp facilitates the entry of a wheel chair from a sidewalk, or the like, into the interior of the vehicle. The Angelo et al U.S. Pat. No. 4,348,780, issued Sept. 14, 1982, and entitled "Apparatus for Elevating a Mobile Rig" is also pertinent in that it relates to a support apparatus for a vehicle, the support apparatus including a pivotal ramp portion which is movable between an angularly disposed position with respect to the ground in order that the vehicle may drive upwardly therefrom. When the vehicle has been positioned on the ramp, one section thereof may be pivoted to an elevated substantially horizontal position for supporting the vehicle in a horizontal position which is elevated with respect to the surface of the ground. These devices have not adequately solved the problems encountered in the loading and unloading of a vehicle, or the like, at a dock area.

SUMMARY OF THE INVENTION

The present invention contemplates a novel combination ramp, dock and loader which has been particularly designed and constructed for overcoming the foregoing disadvantages. The novel ramp/dock/loader apparatus is hydraulically actuated and comprises a ramp section having one end or edge thereof pivotally secured in the proximity of the floor level of a warehouse, storage area, or the like, wherein a loading operation is normally effected. A platform section is pivotally secured to the outer end or edge of the ramp section and is normally disposed in a substantially horizontal position. Hydraulic lift apparatus is operably secured to the ramp section for pivoting thereof about the connection between the ramp section and the floor level of the storage area whereby the angular position of the ramp section may be varied as required for elevating or lowering the horizontal position of the platform section for alignment of the platform section with a vehicle bed, or the like, for facilitating the loading and/or unloading of the vehicle. The personnel unloading or loading materials from or onto the vehicle may walk along the ramp section to a position on the platform section, or drive the normal fork lift apparatus along the ramp section and onto the platform section for performing either the loading or unloading operation in the usual manner. The alignment of the platform section with the elevation of the bed of the vehicle greatly facilitates the labor required for the transfer of materials therebetween. In addition, the platform section may be utilized, in and of itself, in much the same manner as the operation of a front loading fork lift vehicle in that the ramp section may be angularly rotated through a sufficiently large angle for elevating the platform section into a position substantially in alignment with the upper or second story floor. In this manner, materials may be unloaded from the vehicle onto the platform section, the platform section thus loaded may then be elevated into an alignment with the second story floor, whereupon the materials may be easily transferred into the upper story or second story storage area. It will be apparent that a reverse operation may be utilized for transferring materials from an upper story storage area to the proximity of the transferring vehicle. Another asset of the novel ramp/dock/loader apparatus is that the ramp may be utilized as an emergency door, if necessary or desired. When the ramp is pivoted through an angle sufficiently great as to position the ramp in a substantially vertical position, the ramp may be locked in the vertical orientation by the hydraulic apparatus, thus closing the doorway opening at which the apparatus is mounted. Other attempts have been made to provide a combined ramp and door structure, as shown in the Badura U.S. Pat. No. 1,627,548, issued May 10, 1927, and entitled "Granary Door;" the Pratt U.S. Pat. No. 1,671,608, issued May 29, 1928, and entitled "Door Construction and Control Mechanism;" and the Guppy U.S. Pat. No. 4,308,697, issued Jan. 5, 1982, and entitled "Floor Plate Assembly." These references, however, do not include the novel combination of a ramp and platform section of the present invention. The novel ramp/dock/loader apparatus is simple and efficient in operation and economical and durable in construction.

BRIEF DESCRIPTION OF THE DRAWINGS

FIG. 2 is a side elevational view of a ramp/dock/loader apparatus embodying the invention with a lowered position thereof shown in solid lines and an intermediate second position and a vertical third position thereof shown in broken lines.

FIG. 4 is a plan view of a ramp/dock/loader apparatus embodying the invention.

FIG. 5 is a view similar to FIG. 2 and illustrates a modified ramp/dock/loader apparatus embodying the invention.

DETAILED DESCRIPTION OF THE PREFERRED EMBODIMENT

Figure 1:
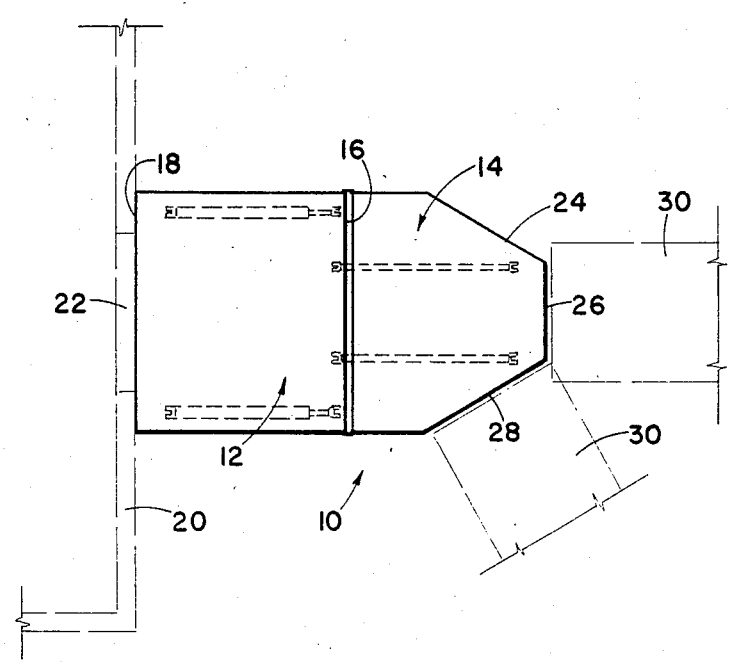
FIG. 1 is a schematic plan view of a ramp/dock/loader apparatus embodying the invention, with portions shown in broken lines for purposes of illustration.

Referring to the drawings in detail, and particularly FIG. 1, reference character 10 generally indicates a ramp/dock/loader apparatus comprising a ramp section 12 having a platform section 14 pivotally secured along one edge or side 14 thereof. The opposite side or edge 18 of the ramp section 12 is preferably disposed adjacent or in the proximity of the outer surface of a wall 20 of a storage area, and preferably in substantial alignment with a doorway 22, or the like, but not limited thereto. The edge 18 is pivotally secured to the wall 20 in a manner as will be hereinafter set forth and is movable about the pivot connection in a vertical direction between the lower first position shown in solid lines and the vertical third position therefore shown in broken lines in FIG. 2. The pivotal connection between the ramp section 12 and the platform section 14 is such that the platform section 14 is maintained in a substantially horizontal orientation throughout the entire spectrum of angular movement of the ramp section 12, as will be hereinafter set forth in detail. In addition, the platform section 14 is provided with a plurality of mutually angularly arranged outer or exposed edges or sides 24, 26 and 28 whereby a vehicle (not shown) may be maneuvered into a position in the proximity of the platform section 14 with the vehicle bed 30 thereof disposed in substantially any angular orientation with respect to the plane of the wall 20 or with respect to the longitudinal axis of the platform section 14. Two of the possible positional relationships between the vehicle bed 30 and the platform section 14 are shown in broken lines in FIG. 1.

Figure 3:
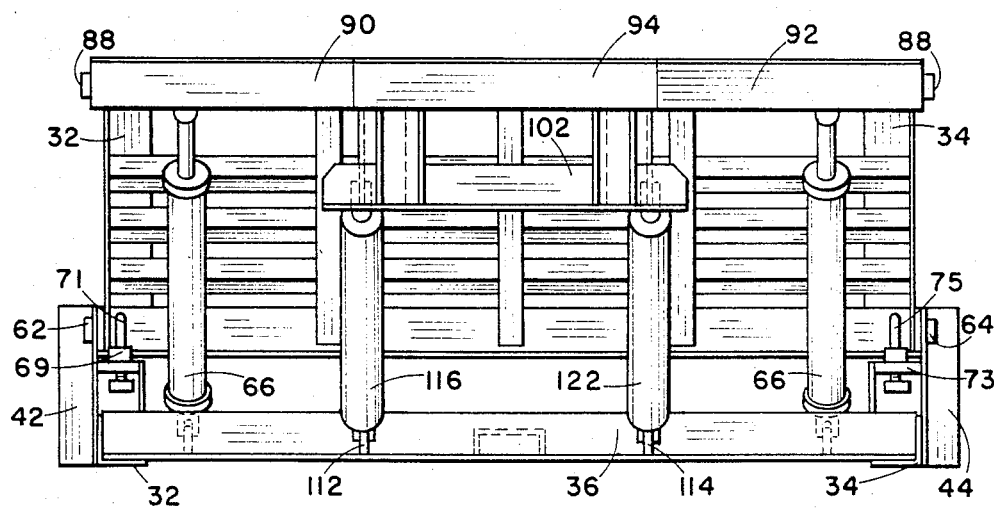
FIG. 3 is a front elevational view of a ramp/dock/loader apparatus embodying the invention and illustrated as in the position shown in broken lines in FIG. 2.

Referring now to FIGS. 2, 3 and 4, the ramp section 12 includes a first framework structure 31 preferably of substantially rectangular configuration, but not limited thereto, and comprising a pair of oppositely disposed substantially mutually parallel angle members 32 and 34 spaced apart by a pair of spaced transversely extending angle members 36 and 38. An intermediate angle member 40 is preferably welded or otherwise rigidly secured between the angles 32 and 34 for a purpose as will be hereinafter set forth. A pair of upstanding angle members 42 and 44 may be welded or otherwise rigidly secured to the opposite ends of the angle member 38. A gusset 46 is preferably secured between the angles 42 and 32 for strengthening thereof, and similarly a gusset 48 is preferably secured between the angles 44 and 34.

A second framework structure 49 is disposed in spaced relation with respect to the first framework structure 31 and comprises a pair of oppositely disposed mutually parallel angle members 50 and 52 spaced apart by a pair of transversely extending rod members 54 and 56. In addition, it is preferable to provide a plurality of spaced intermediate cross members 58 secured between the angles 50 and 52 and a plurality of spaced longitudinally extending strap members 60 secured between the rod members 54 and 56 to provide rigidity for the second framework structure 49, as is well known. It is also preferable that the angle members 50 and 52 be of a greater overall length than the angle members 32 and 34 whereby the rod members 56 are disposed beyond or outboard of the outer extremity of the angle members 32 and 34, but not limited thereto. A suitable floor plate member 60 may be welded over the upper edges or surfaces of the second framework structure 49 to provide a working area for the apparatus 10 as will be hereinafter set forth.

The rod member 54 is journalled between the upstanding angle members 42 and 44 in any suitable manner such as shown at 62 and 64 whereby the entire second framework structure 49 may be pivoted in a vertical direction about the substantially horizontal pivot axis established by the pivot connections 62 and 64. The second framework 49 may be moved from the position shown in solid lines in FIG. 2 to a substantially vertical position as shown in broken lines in FIG. 2. A suitable fluid cylinder means 66 is operably connected between the first framework structure 31 and the second framework structure 49 for achieving the pivotal action for the second framework structure. As shown herein, the fluid cylinder means 66 is preferably a hydraulic cylinder means, and comprises a single or a pair of substantially identical cylinders 66 disposed in the proximity of the opposite sides of the ramp section 12. Since each of the cylinders 66 is substantially identical in installation to the other cylinder 66, only one will be set forth in detail herein.

The cylinder housing of the cylinder 66 is pivotally secured to the cross member 40 in any well known manner, such as by a bifurcated member 74 pivotally secured to a flange member 76 secured to the outer periphery of the rod 56. Fluid may be directed into the interior of the cylinder at one end thereof and withdrawn from the opposite end thereof in the usual or well known manner for providing reciprocation of the rod 72. When the rod 72 is extended axially outwardly from the cylinder housing, the second framework structure 49 will be rotated in a counterclockwise direction about the pivots 62 and 64, as viewed in FIG. 2. Conversely, when the rod 72 is withdrawn or contracted into the cylinder housing, the second framework structure 49 will be rotated in a clockwise direction as viewed in FIG. 2. It will be noted that the second framework 49 will be positioned against the outer surface of the doorway 22 when the framework 49 is in the vertical position therefor, thus closing the doorway. The framework 49 may be locked in this vertical orientation by locking the reciprocal rod 72 in its extended position in any well known manner, thus providing an emergency closing of the doorway 22, if desired.

An upstanding post means 69 may be secured to the angle member 32 in the proximity of the outermost end thereof for receiving an adjustable stop means 71 therein. A similar upstanding post means 73 may be secured to the angle member 34 in the proximity of the outer end thereof for receiving an adjustable stop means 75 therein. The position of the outermost ends of the stop means 71 and 75 may be adjusted as required and are engaged by the second framework 49 for limiting the movement thereof in the clockwise direction, thus maintaining the framework 49 in spaced relation and substantially parallel to the framework 31 in the normal lowered position of the framework 49.

The platform section 14 includes a framework structure 77 of any suitable type, and as shown herein comprises a first cross member or transversely extending angle member 78 having relatively short angle members 80 and 82 welded or otherwise rigidly secured to the opposite ends thereof and extending substantially perpendicularly outward therefrom in a direction away from the ramp section 12. Flange or strap members 84 and 86 are secured to the outer ends of the cross member 78 and are apertured for pivotal connection with the opposite ends of the rod member 56 as shown at 88 in FIG. 2. In this manner the framework 77 is pivotally secured to the ramp section 12 for a purpose as will be hereinafter set forth. A pair of converging angle members 90 and 92 are rigidly secured to the outer ends of the angle members 80 and 82, respectively, and are secured together at their outer ends by a cross member 94. It is preferable to provide at least one cross member or transversely extending angle member 96 at the juncture between the angles 80 and 90 and the angles 82 and 92 to provide rigidly for the framework 77, as is well known. In addition, a plurality of spaced longitudinally extending channel members 98 may be rigidly secured between the cross members 78 and 96 and other structural members as generally indicated at 100 in FIG. 2 may be provided for the framework 77 for increased strength and rigidity therefor, as is well known. Of course, a suitable floor plate 101 may be secured to the outer surface of the framework 77 as is well known.

One particular cross member 102, which may be in the form of an elongated plate member is secured between the angular disposed frame members 90 and 92, and an angle member 104 is preferably secured along the lowermost edge thereof as shown in FIG. 2. The angle member 104 may be suitably braced by arms 105. At least one, and preferably a plurality of adjustable support legs 106 may be secured to the angle member 106 for supporting the framework 77 in a normal lowered and substantially horizontal position, and in selected spaced relation with respect to the ground or supporting surface wherein the apparatus 10 is installed. A pair of spaced bracket or flange members 108 and 110 are rigidly secured to the cross member 102 and extend axially outwardly therefrom in a direction toward the ramp section 12. Flanges 112 and 114 may be rigidly secured to the cross member 36 in substantial alignment with the brackets 108 and 110, respectively. A first link means 116 of fixed length has one end pivotally secured to the bracket 108 in any suitable manner as shown at 118 and the opposite end thereof pivotally secured to the flange 112 as shown at 120. A similar link means 122 of a fixed length has one end pivotally secured to the bracket 110 as shown at 124 and the opposite end pivotally secured to the flange 114 as shown at 126. In this manner, the platform section 14 is pivotally secured to the ramp section 12 for pivotal movement in a vertical direction about the longitudinal axis of the rod member 56.

When the ramp section 12 is rotated about the pivot connections 62 and 64, the pivotal connection of the link members 116 and 122 combined with the fixed length of each link member causes the platform section 14 to rotate about the longitudinal axis of the rod means 56 in a reverse direction with respect to the direction of rotation of the ramp section 12 about its pivot connections 62 and 64. Thus, the orientation of the platform section 14 is always maintained in a substantially horizontal orientation, as shown in both solid and broken lines in FIG. 2.

In use, a vehicle (not shown) to be either loaded with materials or unloaded, may be positioned with the bed 30 thereof in the proximity of the platform section 14. As hereinbefore set forth, the angular position of the bed 30 of the vehicle may be substantially as required by virtue of the angular position of the side members 90 and 92 of the platform section as well as the outer end cross member 94, and as particularly shown in FIG. 1. In the event the height of the bed 30 of the vehicle is of a higher elevation than the normal lowered position of the platform section 14 as shown in solid lines in FIG. 2, the cylinders 66 may be actuated in the normal manner for extending rod members 72 axially outwardly. This action causes the ramp section 12 to rotate in a counterclockwise direction about the pivot connections 62 and 64, as shown in broken lines in FIG. 2. Simultaneously, the platform section 14 is elevated, remaining in its substantially horizontal orientation, and when the elevation of the floor 101 of the platform section 14 moves into substantial alignment with the elevation of the vehicle bed 30, as shown as position A in FIG. 2, the rotation of the ramp section 12 may be ceased. In this position, the framework 77 will be in a substantially horizontal orientation, and the movement of materials to and/or from the vehicle bed 30 may be easily accomplished in any well known manner. When the materials have been moved from the vehicle bed 30 onto the platform section 14, for example, the angularly disposed ramp section 12 may be utilized in the normal manner of a ramp for facilitating the movement of the material to the proximity of the doorway 22 for loading into the storage area. In the event the material being unloaded from the vehicle bed 30 is to be stored at the second or upper story of the storage area, the material may be moved from the vehicle bed 30 onto the platform section 14 in the usual manner, whereupon the ramp section 12 may be rotated through a greater angle in a counterclockwise direction as viewed in FIG. 2 until the floor plate 101 of the platform section 14 is positioned in substantial alignment with the upper story as shown in broken lines in FIG. 2 as position B. The materials on the platform section 14 may then be easily transferred for storage at the upper level of the storage area.

Of course, the operation of the apparatus 10 may be substantially reversed when materials are to be transferred from the storage area onto the bed 30 of the vehicle. For example, the platform section 14 may be moved to the position B as hereinbefore set forth whereupon materials may be transferred from the upper floor or second story of the storage area. When the materials are placed on the platform section 14, the ramp section 12 may be rotated in a clockwise direction, as viewed in FIG. 2, for moving the platform section 12 in a position of alignment with the bed 30 of the vehicle into which the materials are to be loaded.

It will be readily apparent that the materials may be transported in any suitable manner between the storage area and vehicle bed. For example, the materials may be hand carried, or may be transported on the usual material handling dolly, fork lift vehicle, or the like, as desired.

In some instances it may be desirable to maintain the framework 49 of the ramp section 12 in a substantially horizontal orientation, and pivot the framework 77 of the platform section 14 about the longitudinal axis of the rod means 56 in a vertical plane whereby the orientation of the platform section 14 will be angularly disposed as shown in broken lines in FIG. 5. When this condition arises, the ramp section 12 functions as a platform section and the platform section 14 functions as a ramp. In order to achieve the reverse action of the ramp section 12 and platform section 14 in this manner, it is desirable to eliminate the angle member 104, brace arms 105, support legs 106 and flange members 108 and 110. In lieu thereof, a toggle assembly generally indicated at 130 may be operably secured between the platform section 14 and the fixed link members 116 and 122. Only one of the toggle assemblies 130 is shown in FIG. 5, and it is to be understood that both toggle assemblies are substantially identical and function simultaneously during the operation of the sections 12 and 14. The toggle assembly 130 may comprise a first toggle link 132 pivotally secured between the platform section 14 and the respective fixed link member 116 or 122, and a second link member 134 having one end pivotally secured to the toggle link 132 as shown at 136. The opposite end of the link member 134 is pivotally secured to a suitable torsion bar means 138 in any suitable manner (not shown). The torsion bar means 138 extends between the toggle assemblies 130 to provide coordinate or simultaneous action therebetween.

The torsion bar means 138 is operably connected to a suitable fluid cylinder means 140 which is preferably secured to the framework 77 substantially centrally disposed between the toggle assemblies 130. When it is desired to move the framework 77 through a vertical angular plane from a substantially horizontal position as shown in solid lines in FIG. 5 to an angularly disposed position as shown in broken lines therein, the cylinder 140 may be activated for rotating the torsion bar means 138 in a direction to actuate the toggle assemblies from the position shown in solid lines to the position shown in broken lines in FIG. 5. This moves the framework 77 to a planar position which is angularly orientated with respect to the planar position of the framework 49. In this manner, material may be moved from a first position, which may be at a lower elevation than the upper surface of the framework 49 to the upper surface of the ramp section over the upper surface of the platform section 14 which now functions in the manner of a ramp.

There are many and varied attachments and devices, of common knowledge that can be and will be used in conjunction with this device, but for simplicity's sake, were not included in the body of this application.

These aforementioned options would include safety rails, safety chains, hinged flap aprons for bridging gaps, automatic load locking devices for hydraulic system, auxiliary mechanical door latching features and a host of arrangements which are current state of the art throughout the industry. In fact, practically all of the options of accessories currently available and used on the extremely common hydraulic scissor lift dock devices will also be, more or less, directly applicable to the ramp/dock hydraulic device outlined in this application.

From the foregoing, it will be apparent that the present invention provides a novel ramp/dock/loader apparatus which comprises a ramp section pivotally secured in the proximity of a storage area, and a platform section pivotally secured to the outer edges of the ramp portion. Fluid actuated cylinder means is operably connected with the ramp section for effecting the pivotal action therefor, and the platform section is operably secured to the ramp section in such a manner that the platform section is maintained in a substantially horizontal orientation during the pivoting of the ramp section. The elevation of the platform section may be adjusted to coincide with the elevation of a vehicle bed for facilitating the unloading and loading of materials therebetween. In this manner the platform section functions as a dock, the ramp section functions as a ramp, and the entire apparatus cooperating in its concerted pivotal movements functions as a loader apparatus.

Whereas the present invention has been described in particular relation to the drawings attached hereto, it should be understood that other and further modifications, apart from those shown or suggested herein may be made within the spirit and scope of this invention.

What is claimed is:

1. A variable height dock comprising:
 a horizontal first framework structure for fixed support on the earth's surface or other support surface, the first framework structure having a forward end and a rearward end;
 a second framework structure having a forward end and a rearward end, said second framework being pivotally supported by and attached to, extreme rear of the rear uppermost section of said first framework structure, said second framework structure having an upper surface covered by decking;
 a platform section having a forward end and a rearward end, the rearward end being pivotally attached to said second framework structure forward end, the platform section having an upper surface covered by decking;
 a supporting link member pivotally attached at one end to said first framework structure adjacent the forward end thereof and pivotally attached at the other end to said platform section adjacent the forward end thereof, said link member to be exact match in pivotal length to the pivotal length of the second framework structure, thus achieving the constant horizontal attitude of the platform section throughout full pivotal travel of the system;
 a cylinder-piston member of conventional design pivotally affixed at one end to said first framework structure and at the other end to said second framework adjacent the forward end thereof, the cylinder-piston member being variable in length by the control of hydraulic or pneumatic fluid thereto whereby the elevation of the said forward end of said second framework structure may be varied, resulting in angular displacement of said second framework up to a full 90 degrees, the elevation of said platform section being thereby varied, the platform section remaining horizontal at all elevations regardless of the amount of cargo loading placed thereon, or whether in a raising, lowering, or holding mode, said second framework section providing a ramp from said horizontal platform section, ramp effect being horizontal when platform section is in the fully lowered position but becoming an inclined ramp as platform structure is raised;
 a variable height dock for use with a structure having a floor and a doorway, said second framework structure rearward end being adjacent the structure doorway and said decking thereon being substantially equal the height of the structure floor at said second framework structure rearward end whereby said second framework structure decking provides an inclined ramp to the floor regardless of the height of said platform section, and wherein, when said second framework structure is raised to the vertical position, said decking thereon provides a complete doorway closure, said doorway closure is effective with or without the existance of an auxiliary adjacent structure door, said doorway closure effect by said second framework structure when utilized in conjunction with a conventional door, serves as a security door.

2. A variable height dock according to claim 1 including:

means for limiting said second framework structure forward end downward pivotation.

3. A variable height dock according to claim 2 in which said means of limiting said second framework structure forward end downward pivotation includes means wherein said second framework structure decking is horizontal when the downward pivotation limit is reached.

* * * * *